May 12, 1931.    J. W. HUBBARD    1,804,772
LARD FILLING MACHINE
Filed July 28, 1928    3 Sheets-Sheet 2
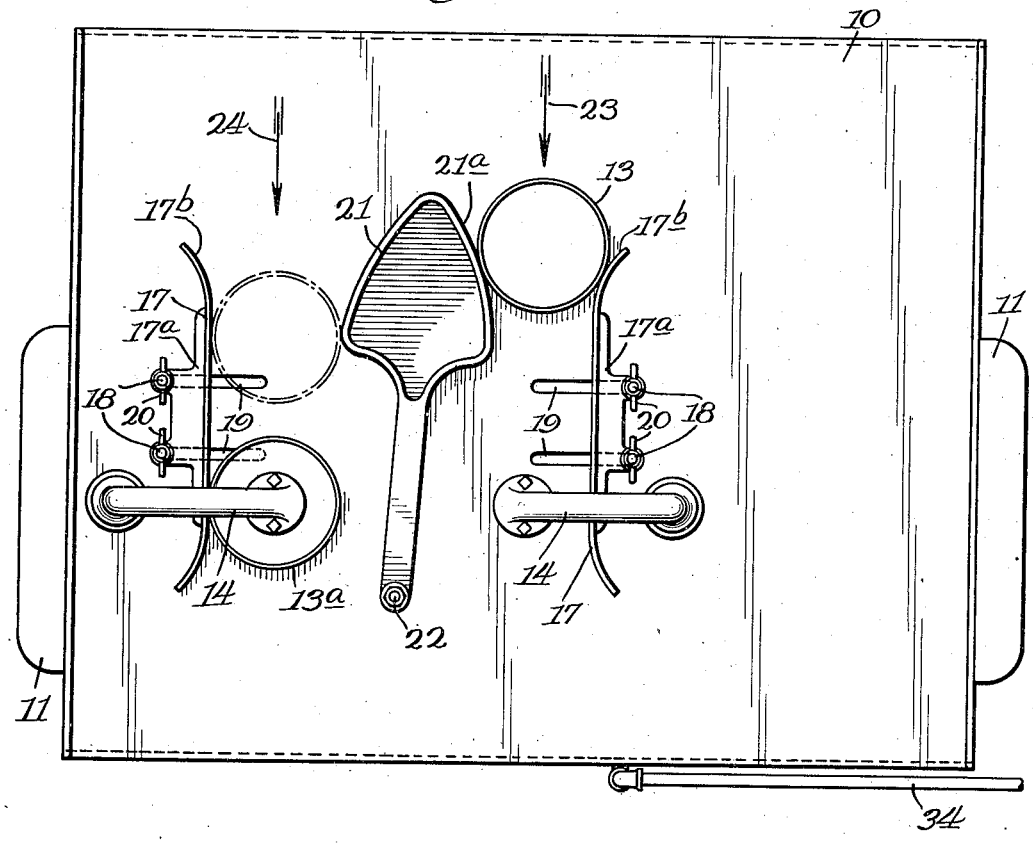
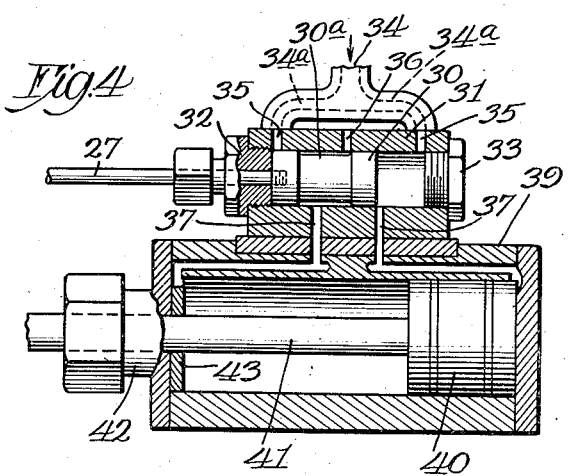
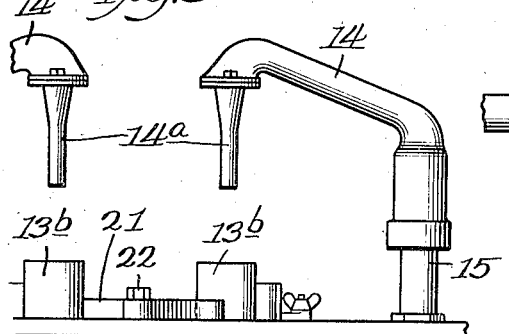

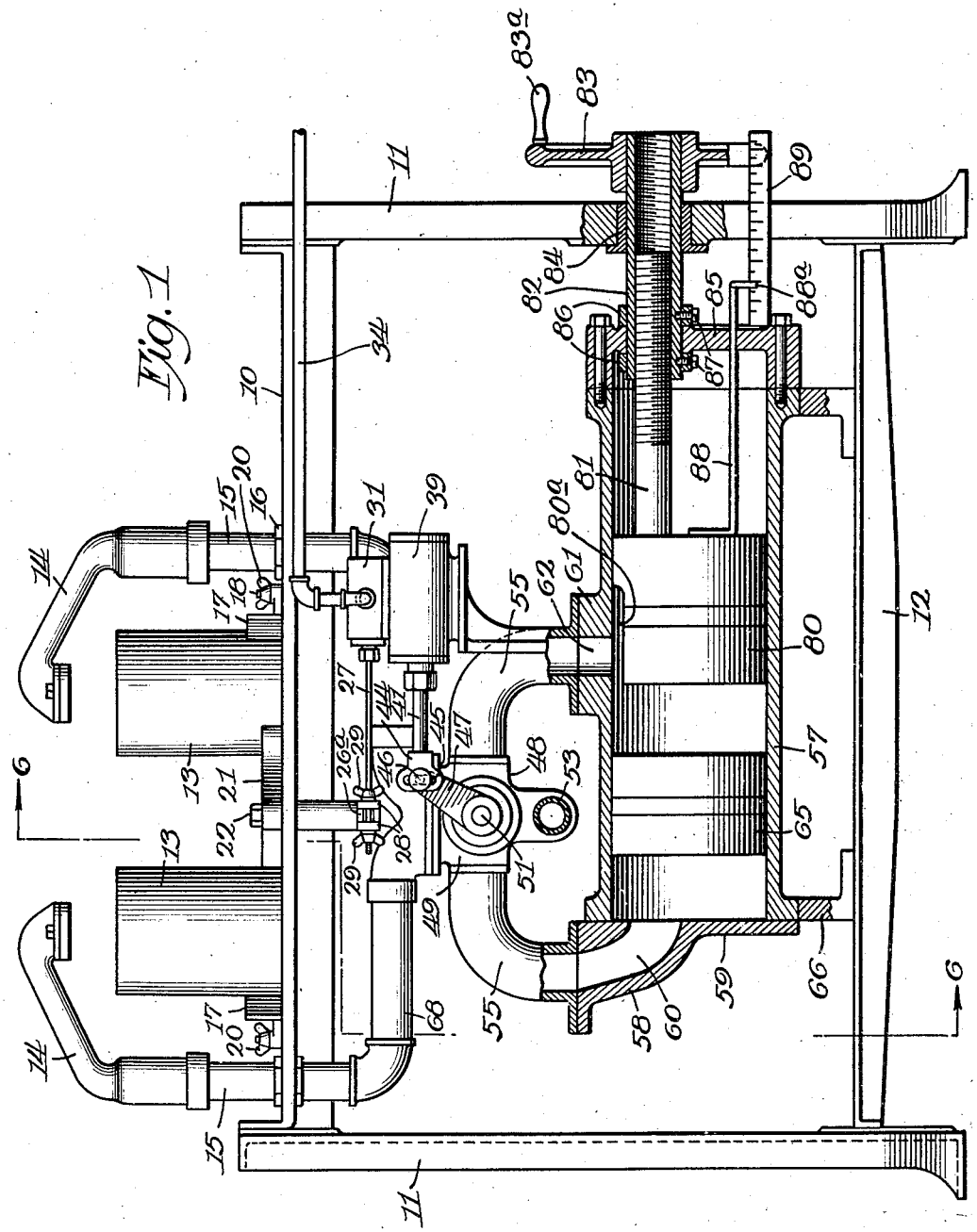

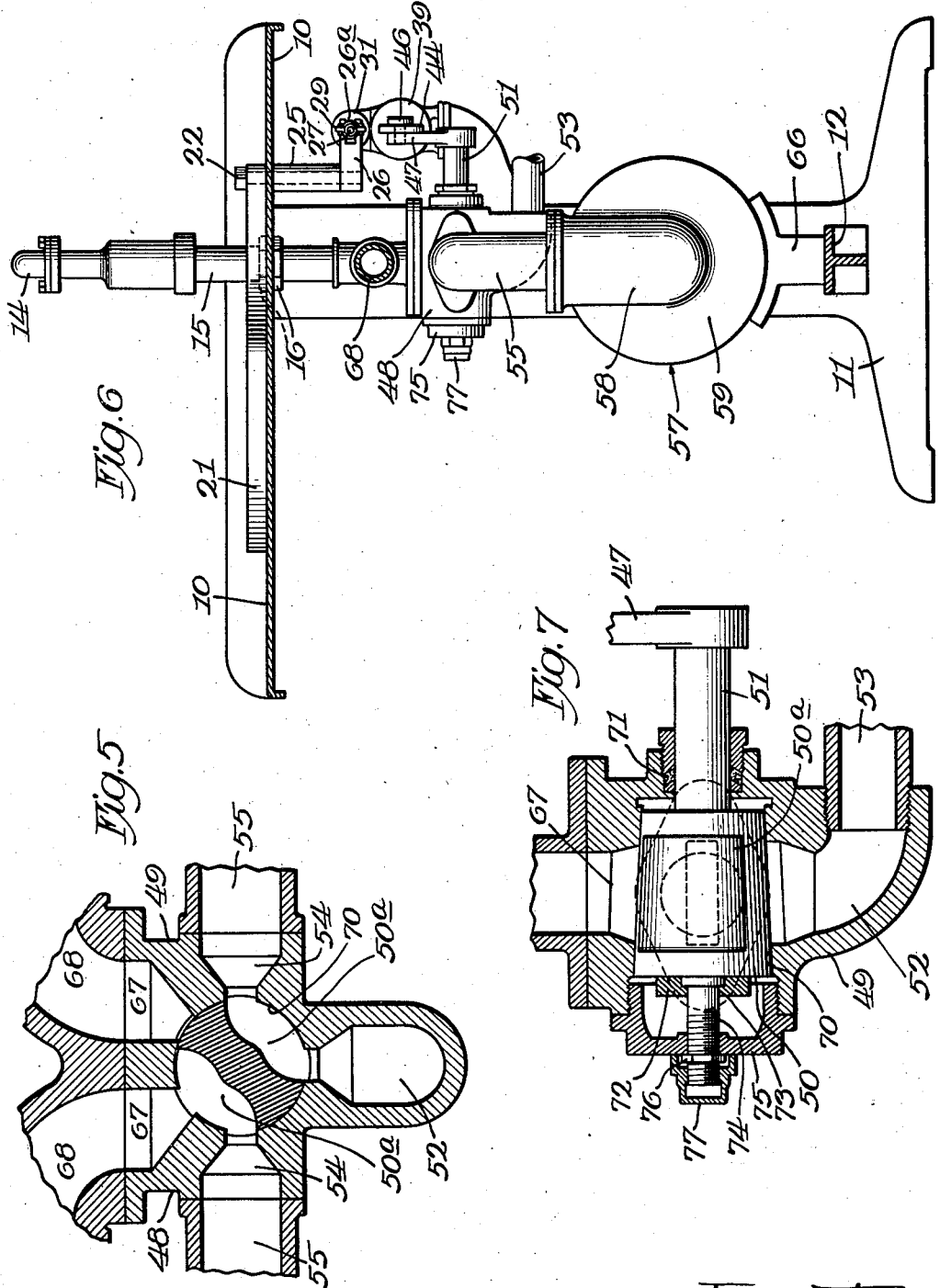

Patented May 12, 1931

1,804,772

UNITED STATES PATENT OFFICE

JAMES W. HUBBARD, OF CHICAGO, ILLINOIS, ASSIGNOR TO THE MECHANICAL MANUFACTURING COMPANY, OF CHICAGO, ILLINOIS, A CORPORATION OF ILLINOIS

LARD FILLING MACHINE

Application filed July 28, 1928. Serial No. 295,876.

This invention relates to improvements in measuring and filling machines adapted for use in measuring quantities of lard or other materials in a fluid condition and filling such materials into cans or other receptacles. The principal object of the invention is to provide a simplified and improved machine which may be conveniently and efficiently operated for filling cans or the like with measured quantities of fluid. An important object of the invention is to provide a machine in which the discharge of the measured quantities of fluid into the cans or other receptacles is controlled by the movement of the cans to filling position. A further object is to provide a filling machine having a plurality of discharge nozzles in combination with means whereby the movement of a can or other receptacle to position beneath one nozzle serves to actuate the mechanism by which the fluid is discharged from the other nozzle into a receptacle previously positioned thereunder. Still another object of the invention is to provide a machine in which the measuring and filling apparatus is operated by fluid controlled mechanism actuated by the movement of the receptacle to filling position. Other objects relate to various features of construction and arrangement which will appear more fully hereinafter.

The nature of the invention will be understood from the following specification in connection with the accompanying drawings in which one embodiment of the invention is illustrated. In the drawings,—

Figure 1 shows a side elevation of the improved measuring and filling machine of the present invention, with the measuring and filling cylinder and associated parts shown in longitudinal vertical sections;

Fig. 2 shows a top plan view of the improved measuring and filling machine illustrated in Fig. 1;

Fig. 3 shows a side elevation of the upper portion of the machine, similar to the view of Fig. 1, illustrating the adjustment of the parts for filling cans of relatively small size;

Fig. 4 shows a longitudinal section through the fluid operated cylinder and associated parts by which the measuring and discharging cylinder is controlled;

Fig. 5 shows a vertical section through the multiple-passage valve by which the discharge from the large measuring cylinder is controlled;

Fig. 6 shows a vertical section taken on the line 6—6 of Fig. 1 looking in the direction of the arrows; and Fig. 7 shows a longitudinal vertical section through the multiple-passage discharge valve shown in Fig. 5.

As illustrated in the accompanying drawings, the invention comprises a table 10 supported on legs 11 which are connected, adjacent their lower ends, by means of a longitudinal frame member 12. The table 10 serves as a support over which the cans or other receptacles to be filled are moved by the operator of the machine and the lard or other fluid is adapted to be discharged into these cans 13 from two discharge nozzles 14 which are mounted on pipes 15 extending upwardly through the table tops and secured in fixed position by the lock nuts 16. The cans 13 are adapted to be moved over the table tops in two paths of travel, each path being adjacent to a guide member 17 having a base flange 17ª which is engaged by a pair of clamping bolts 18 extending upwardly through slots 19 in the table top and engaged at their upper ends by the adjustable wing nuts 20. By loosening the nuts 20 and adjusting the positions of the bolts in the slots 19, the guide member 17 may be varied in spaced relation from the valve operating member 21 which is pivoted on a valve operating rod 22 extending upwardly through the table top 10. As the can 13 is moved forwardly along the path of travel indicated by the arrow 23 in Fig. 2. it engages the curved extremity 17ᵇ of one of the guide members 17 and simultaneously engages one lateral curved side 21ª of the heart-shaped head which is formed on the valve operating member 21. The space between the valve operating member 21 and the guide member 17 being less than the width of the can 13, the movement of the can along the path of travel 23 toward the discharge nozzle located in that path of travel, serves to push the valve operated member 21 toward the other guide member 17, thereby operating the mechanism hereinafter described to cause the discharge of the lard or other fluid being measured into the can 13ª which has previously been moved into position beneath the other discharge nozzle, as illustrated in Fig. 2. In this way, the cans 13 are alternately fed forward along the paths of travel indicated by the arrows 23 and 24 with the result that the forward movement of a can along one path of travel to filling position actuates the valve mechanism to cause the discharge of fluid from the other nozzle into a can which has previously been positioned by forward movement along the other path of travel adjacent the other guide member. In this way, the operation of the machine is rendered automatic by the mere feeding movement of the cans and predetermined quantities of lard or other fluid are discharged into the cans as they reach filling position. By adjusting the positions of the guide members 17, the cans 13 of any desired diameter and volume may be filled from the discharge nozzle 14. In Fig. 3, there is illustrated the modification of the discharge nozzles 14 by the application thereto of the restricted discharge spouts 14ª which extend downwardly into relatively close proximity with the open mouths of relatively small cans 13ᵇ which may be filled when the guide members 17 are adjusted inwardly to the proper extent.

The valve operating rod 22 is journaled in a bearing member 25 secured to the under side of the table 10, as shown in Fig. 6, and it carries at its lower end a crank arm 26 having a slotted end 26ª which receives the plunger 27 of a compressed air valve device. A pair of collars 28 are located on the plunger 27 on opposite sides of the crank arm 26 and are secured in adjusted position by the wing nuts 29. The other end of the plunger 27 carries a piston valve 30 which is located in the valve cylinder 31, one end of which is closed by a plug 32 having an aperture therein through which the plunger rod 27 slides, while the other end of this valve cylinder is closed by a detachable plug 33. Compressed air is admitted to the valve cylinder through a pipe 34 having two branches 34ª which lead to opposite ends of the air cylinder 31 through inlet ports 35. The intermediate part of the cylinder has an outlet port 36 through which air may be discharged. The central part of the piston 30 is provided with an external annular recess 30ª which establishes a communication between the exhaust port 36 and one or the other of two ports 37 which lead downwardly through the bottom of the valve cylinder 30 and thence longitudinally through the walls of the air cylinder 39, communicating with the internal chamber of the cylinder 39 adjacent the ends thereof, as shown in Fig. 4. The air cylinder 39 has mounted therein a piston 40 which is secured to a piston rod 41 arranged to slide through a bearing 42 in one end wall of the cylinder and having its other end connected to the valve by which the discharge of the lard or other fluid is controlled.

The piston rod 41 is connected to a head 44 having a vertical slot 45 therein which is engaged by a pin 46 secured to the end of a crank arm 47 which serves to operate the large valve 48. The valve 48 comprises a casing 49 having located therein a rotatable valve member 50 mounted on a shaft 51 which carries the relatively fixed crank arm 47. When the crank arm 47 is operated by the reciprocation of the piston 40 and the cylinder 39, the corresponding rotation of the valve member 50 serves to establish appropriate connections between the proper pairs of outlet and inlet ports which are provided in the casing 49. The lower part of the casing 49 is provided with a port 52 which communicates with a pipe 53 through which the lard or other fluid is supplied to the machine from a suitable source under pressure, so that the pressure of the inflowing lard may be utilized for discharging a measured quantity of lard, previously drawn in through the valve 48, from the measuring apparatus through one of the discharge nozzles 14. At the ends of the valve casing 49, are two ports 54 each of which communicates with a pipe 55, in the form of an elbow, having communication with one end portion of the measuring cylinder 57. One of the elbows 55 is connected with a bracket 58 formed on the head 59 of the cylinder 57 and this bracket has formed therein a passage 60 communicating with one end of the measuring cylinder. The other elbow 55 is secured to a boss 61 carried by the upper side of the cylinder 57 and this boss has a passage 62 therethrough adapted to communicate with the other end of the chamber of the measuring cylinder 57 in which is located a floating piston 65. The cylinder 57 is supported by two brackets 66 secured to the longitudinal frame member 12. The upper side of the valve casing 49 has a pair of ports 67 each of which is adapted to communicate with one of the pipes 68 extending horizontally and having communication with one of the upwardly extending pipes 15 upon which the discharge nozzles 14 are mounted. The valve member 50 is in the form of a truncated cone and it fits the correspondingly tapered bore 70 of the valve casing 49, as shown in Fig. 7. The various ports 52, 54 and 67 lead from the central chamber in which the valve member 50 is mounted and this valve member is provided on opposite sides with passages 50ª which are adapted to establish connections between appropriate pairs of the valve casing ports, as illustrated in Fig. 5. When the valve is in one extreme position, a communication is established through one passage 50ª between the inlet port 52 and one of the ports 54 leading to the measuring cylinder 57 and at the same time there is established a communication through the other passage 50ª between the other port 54 connected with the discharge end of the measuring cylinder 57, and the port 67 which leads through one of the pipes 68 to a discharge nozzle 14. When the valve member 50 is turned through 90 degrees, by the actuation of the piston rod 41 and crank arm 47, the connections are reversed so that the lard or other fluid is then pumped into the other end of the cylinder and the lard which was measured in the cylinder 57 during the preceding stroke, is discharged to one of the discharge nozzles 14. One end of the valve member 50 is connected to the shaft 51 which is rotatably mounted in a stuffing box 71 formed in one end of the valve casing. The other end of the valve member 50 carries a plate 72 having an undercut circular aperture 73 which forms a bearing for the head of an adjusting bolt 74 which passes through the detachable cap 75 of the valve casing and is engaged on its threaded extremity by a nut 76 and the cap 77. By adjusting the position of the member 74 with respect to the cap 75, by which it is threadedly engaged, the tightness of the fit of the valve member 50 in the tapered bore 70 of the valve casing may be varied as desired.

As heretofore indicated, the lard or other fluid is fed into one end portion of the measuring cylinder 57 at the same time that a previously measured portion of lard or other fluid is discharged from the other end of that cylinder. As shown in Fig. 1, the floating piston 65 is in an intermediate position in the cylinder 57 between the end wall 59 and an adjustable end block 80 which serves as the other end wall of the measuring cylinder and which is adjustable in order to vary the capacity of the cylinder to suit the sizes of the cans being filled. The top portion of the block 80 is provided with a recess 80ª extending throughout a portion only of its length so that when the block 80 is in an inner position, a communication will be established between the chamber of the cylinder and the adjacent port 62. The adjustment of the position of the block 80, which closely fits the cylinder wall, is effected by means of a threaded adjusting member 81 which is fixed thereto and which is threadedly engaged by an adjusting sleeve 82 which is internally threaded for engagement with the adjusting member 81 and which has secured to the outer end thereof an adjusting wheel 83 having a handle 83ª. The sleeve 82 is journaled in a bearing 84 carried by one of the end frame members 11 and also in a bearing bracket 85 which is detachably secured to the cylinder 57 to form an end wall thereof. A pair of collars 86 are secured to the sleeve 82 on opposite sides of the end wall 85 by means of set screws 87 so that the sleeve 82 is prevented from longitudinal movement upon rotation thereof. This rotation, effected by the relatively fixed hand wheel 83, serves to effect a longitudinal adjustment of the member 81 in the sleeve 82, thereby varying the position of the block 80 and effecting a corresponding variation in the space within the cylinder 57 which is displaced by the movement of the floating piston 65 when the lard or other fluid is pumped into the cylinder from either end thereof. The position of the block 80 is indicated by means of a pointer 88 which is attached to the end thereof and which extends through an aperture in the end wall 85 with the extremity 88ª thereof arranged to travel over a graduated scale 89 which indicates the capacity of the chamber of the cylinder 57 corresponding to different positions of the end block 80. By adjusting the block 80, the capacity of the chamber within the cylinder 57 may be varied to suit a predetermined capacity of the cans 13 which are to be filled with the lard or other fluid being measured. The pressure of the incoming fluid in the measuring chamber is utilized to discharge the fluid measured on the preceding stroke and this discharging fluid flows through the valve 48 to the appropriate discharge nozzle 14 beneath which a can 13 has been positioned. The operation of the valve 48 is controlled automatically by the operation of the compressed air actuated mechanism which in turn is operated through the movement of the cans 13 to filling position. The alternate movement of these cans along two parallel paths of travel on the table 10 results in the alternate discharge of the lard from opposite ends of the measuring cylinder so that a very rapid and efficient measuring and filling operation may be carried on by the use of this machine.

It will be understood that the term "can" employed herein and in the accompanying claims is employed broadly to include any form of receptacle which may be filled by the use of the present invention. Although one form of invention has been shown and described by way of illustration, it will be understood that it may be constructed in various other forms within the scope of the appended claims.

I claim:

1. A machine for filling cans with a fluid, comprising a plurality of discharge conduits for said fluid, means for supporting cans in a plurality of paths of movement to said discharge conduits, and means actuated by the movement of a can along one of said paths to effect the discharge of said fluid from one of said conduits into a can positioned on another of said paths.

2. A machine for filling cans with a fluid comprising a pair of fluid discharge conduits, supporting means for permitting movement of said cans along two paths to filling positions beneath said conduits, and means comprising a controlling member located between said paths and adapted to be engaged by said cans for controlling the discharge of said fluid from said conduits.

3. A machine for filling cans with a fluid, comprising a pair of conduits through which the fluid is discharged, supporting means for permitting movement of said cans along parallel paths of travel to filling positions beneath the outlets of said conduits, and means comprising a controlling member positioned between said paths of travel for effecting the discharge of said fluid from one of said conduits upon movement of a can along the path of travel leading to the other of said conduits.

4. A machine for filling cans with a fluid, comprising a pair of conduits through which the fluid is discharged, supporting means for permitting movement of said cans along parallel paths of travel to filling positions beneath the outlets of said conduit, means comprising a controlling member positioned between said paths of travel for effecting the discharge of said fluid from one of said conduits upon movement of a can along the path of travel leading to the other of said conduits, and guiding means for engaging said cans during said movement.

5. A machine for filling cans with a fluid, comprising a pair of conduits through which the fluid is discharged, supporting means for permitting movement of said cans along parallel paths of travel to filling positions beneath the outlets of said conduits, means comprising a controlling member positioned between said paths of travel for effecting the discharge of said fluid from one of said conduits upon movement of a can along the path of travel leading to the other of said conduits, guiding means for engaging said cans during said movement, and means for adjusting the position of said guiding means to effect the actuation of said controlling member by different sizes of cans.

6. A machine for filling cans with a fluid comprising a pair of discharge nozzles, a support over which the cans are moved to positions beneath said discharge nozzles, guiding means for engaging the sides of said cans during said movement, a valve for controlling the discharge of said fluid from said nozzles, and a controlling member for said valve having an enlarged cam portion adapted to be engaged by said cans alternately upon movement of said cans along two paths of travel adjacent said guiding means to filling positions beneath said nozzles.

7. A machine for filling cans with a fluid comprising a pair of fluid discharge nozzles, a table over which the cans are adapted to be moved in two lines of travel to filling positions beneath said nozzles, guiding means to engage said cans during movement along each of said paths of travel, a valve for controlling the discharge of said fluid from said nozzles, and a controlling member for said valve positioned between said paths of travel of said cans and having parts adapted to permit movement of a can along one of said guiding means upon actuation thereof by said can to cause the discharge of said fluid from a nozzle under which a can has previously been positioned by movement along the other of said guiding means.

8. A machine for filling cans with a fluid comprising a pair of fluid discharge nozzles, a table over which the cans are adapted to be moved in two lines of travel to filling positions beneath said nozzles, guiding means to engage said cans during movement along each of said paths of travel, a valve for controlling the discharge of said fluid from said nozzles, a controlling member for said valve positioned between said paths of travel of said cans and having parts adapted to permit movement of a can along one of said guiding means upon actuation thereof by said can to cause the discharge of said fluid from a nozzle under which a can has previously been positioned by movement along the other of said guiding means, means for adjusting said guiding means inwardly to cause the actuation of said controlling member by different sizes of cans, and nozzle extensions attached to said discharge nozzles for permitting the filling of different sizes of cans.

9. A machine for filling cans with a fluid comprising fluid measuring means having a pair of measuring chambers, a valve, a fluid inlet conduit leading to said valve, a conduit leading from said valve to each of said measuring chambers, a pair of discharge conduits leading from said valve, means for actuating said valve to cause the fluid to flow from said inlet conduit to one of the measuring chambers simultaneously with the flow of fluid from the other of said measuring chambers through said valve into one of said discharge conduits, supporting means for permitting the movement of cans to positions opposite the mouths of said discharge conduits, and means actuated by the movement of cans to filling positions opposite said discharge conduits for controlling said valve actuating means.

10. A machine for filling cans with a fluid comprising a measuring cylinder, a piston dividing said cylinder into a pair of measuring chambers, a fluid conduit connected with each of said measuring chambers, a fluid inlet conduit, a pair of discharge conduits, a valve for connecting said inlet conduit with one of said first named conduits and simultaneously connecting the other of said first named conduits with one of said discharge conduits, means for actuating said valve, and means controlled by the movement of the cans to filling positions opposite said discharge conduits for controlling said valve actuating means.

In testimony whereof, I have subscribed my name.

JAMES W. HUBBARD.